United States Patent [19]

Pollak et al.

[11] Patent Number: 4,928,482
[45] Date of Patent: May 29, 1990

[54] CONTROL OF HIGH COMPRESSOR VANES AND FUEL FOR A GAS TURBINE ENGINE

[75] Inventors: Robert R. Pollak, North Palm Beach; Juan A. Marcos, Jupiter, both of Fla.

[73] Assignee: United Technologies Corporation, Hartford, Conn.

[21] Appl. No.: 246,728

[22] Filed: Sep. 20, 1988

[51] Int. Cl.$^5$ .............................................. F02C 9/54
[52] U.S. Cl. .................................. 60/39.161; 60/39.27
[58] Field of Search ............... 60/39.161, 39.27, 39.29, 60/240

[56] References Cited

U.S. PATENT DOCUMENTS

| | | | |
|---|---|---|---|
| 2,931,168 | 4/1960 | Alexander et al. | 60/39.27 |
| 4,184,327 | 1/1980 | Cornett et al. | 60/39.27 |
| 4,244,181 | 1/1981 | Wiher et al. | 60/39.161 |
| 4,299,088 | 11/1981 | Rowen et al. | 60/39.27 |
| 4,550,565 | 11/1985 | Ozono | 60/39.27 |

Primary Examiner—Louis J. Casaregola
Attorney, Agent, or Firm—Norman Friedland

[57] ABSTRACT

The time responsiveness and engine stability for an acceleration and deceleration engine transient is enhanced by a control mechanism that synchronously adjusts fuel flow and high pressure compressor vane position as a function of corrected low pressure compressor speed in a twin spool axial flow turbine power plant. The acceleration and deceleration mode is targeted by power lever position and the target is attained by adjusting the vane position at a constant high pressure compressor speed and returned to a fuel efficient and engine stable steady state operating line by concomittantly adjusting fuel flow and vane position.

7 Claims, 2 Drawing Sheets

CONTROL OF HIGH COMPRESSOR VANES AND FUEL FOR A GAS TURBINE ENGINE

This invention was made under a Government contract and the Government has rights herein.

CROSS REFERENCE

The subject matter of this application is related to the subject matter of commonly owned U.S. patent applications Ser. Nos. (Attorney Docket Nos. F-6036 and F-5759) filed on even date herewith and entitled "Control of Low Compressor Vanes and Fuel for a Gas Turbine Engine" and "Active Geometry Control System for Gas Turbine Engines", respectively.

TECHNICAL FIELD

This invention relates to gas turbine engines for powering aircraft and particularly to the control on an engine of the type that includes variable vanes on the high pressure compressor of a twin spool axial flow compressor.

BACKGROUND ART

As is well known and historically, the control for the gas turbine engine has typically adjusted fuel flow in attempting to optimize operation of the engine. In a typical installation the fuel control monitors a plurality of engine operating parameters and processess these signals to produce outputs that would be indicative of a desired engine operation while assuring that the engine avoids surging, overheating and rich and lean flame out. To achieve this goal the computer portion of the control manifests a control logic that represents the operation of the engine and continuously schedules fuel flow to reflect the setting of the power lever. In engines, particularly of the military variety, the control also, independently, monitors engine variables to schedule the variable geometry portions of the engine such as inlet guide vanes, exhaust nozzles and the like, to likewise attain optimum operation for any given operation within the engine's operating envelope.

Hence, it is apparent that a change in one control function would affect the condition of others so that there would be constant iterations of each of the controls to assure optimum operation of each. For example, a change in the exhaust nozzle area would typically change the pressure within the engine, which pressure would be monitored by the fuel control, which in turn would manifest a change in the fuel control to ultimately adjust fuel flow to reflect this change. In this process the scheduling of the fuel flow either to increase or decrease fuel will occur even prior to the time it takes the variable geometry of the engine to react. This "bootstrapping" effect has been addressed in U.S. application No. (Attorney Docket No. F-5759) entitled Active Geometry Control System for Gas Turbine Engines, supra.

In this co-pending application, supra, the control attains a faster thrust response and improved surge margin by synchronously scheduling fuel flow and the variable geometries of the engine in response to a single parameter which is a function of certain engine and aircraft operating variables. In order for this type of active geometry control system to be a useful system, it must be able to attain a high degree of repeatability in assuring that for any given setting the control will return to a given steady state operating point in the operating curve after any transition excursion. During a transient excursion, the control logic will assure that the point of operation is identical to the setting of the power lever which request is desired thrust even though the engine operating variable changes as a result of wear and tear of the engine, power extraction or compressor air bleed.

This invention contemplates utilizing a corrected speed (RPM) of the low pressure spool ($N_1$) of a twin spool engine as the primary control parameter. As is the case in many of the military engines, the low pressure spool is only aerodynamically coupled to the high pressure spool. In order to attain the optimum engine operation from a performance standpoint, the corrected rotor speeds for the high and low pressure spool must be proportional to each other for every given steady-state engine condition.

In fighters and other military aircraft, it is extremely important that a demand by the pilot for a change in thrust produced by the engine be as fast and as accurate as possible. The aircraft's ability to undergo the violent maneuvers anticipated when operating in the combat box, for example, in fighter aircraft, bears directly on the performance of that aircraft. When a demand for a thrust change is initiated, for example, when the pilot exercises a bodie maneuver, i.e., a quick demand for a drop in thrust (decel) followed by an immediate demand for an increase in thrust (accel) or vice versa, the engine should attain the demanded thrust levels by decelerating to the desired thrust level before accelerating to the desired thrust level in the quickest time possible. With heretofore known control logic, maneuvers, such as these bodies as well as chops, are influenced by the constraints owing to the high inertia of the rotating spool. Since a thrust change necessitates a decrease or increase in RPM of the high pressure compressor, this high inertia adversely affects the time responsiveness of the engine.

Needless to say, it is also extremely important that the engine operates as efficiently as possible to achieve good TSFC (thrust specific fuel consumption) and stable engine operating conditions, namely, avoiding surge, engine flame out and overheating.

We have found that by controlling both the fuel and high compressor variable vanes as a function of corrected low pressure compressor speed, we can enhance both steady state and transient operations. In transients, this invention contemplates locking in a fixed corrected high compressor speed ($N_2$), setting a target for the desired thrust and zeroing in on this target by adjusting the angle of the high compressor variable vanes. This logic allows the low pressure compressor spool to adjust speed to a value corresponding to the targeted thrust (Fn). A proportional plus integral controller assures that the $N_1$ speed is properly attained while $N_2$ is held constant. Once the target is reached, the active high compressor controller (AHCC) automatically trims the high pressure compressor spool speed and HCVV to return to the operating line at a value that is equivalent to the desired speed ratio of the high and low pressure compressor to assure optimum engine performance.

DISCLOSURE OF THE INVENTION

An object of this invention is to provide improved control logic for a twin spool having variable area vanes of the high spool of a gas turbine engine powering aircraft that assures fast thrust response responsive to power lever input while assuring optimum TSFC when the engine operates in the quiescent state.

A feature of this invention is control logic of a twin spool gas turbine engine that controls fuel flow and the high compressor variable vanes as a function of a low pressure compressor speed parameter, which parameter is a function of Mach No., engine inlet total pressure and temperature and the position of the power lever. Transient conditions (accel and decel) are attained by locking in the high compressor spool speed, targeting low compressor spool speed to attain the thrust level dictated by the demand of the power lever, and steady state conditions are attained by synchronously trimming the speed of the high pressure compressor and the position of the high pressure compressor variable vanes until the designed low-to-high pressure compressor speed condition is reached.

Another feature of this invention is to utilize a timer that may be reset as a function of aircraft or engine operating variables to trim the control to a steady state condition some time after a thrust target has been achieved.

Another feature of this invention is to provide in control logic as described means for locking in the high pressure compressor speed as a function of the position of the power lever so that the lock condition will not deviate in deference to external influences, such as, wear and tear of the engine, and power extraction for aircraft accessories and the like.

The foregoing and other features and advantages of the present invention will become more apparent from the following description and accompanying drawings.

BEST MODE FOR CARRYING OUT THE INVENTION

As mentioned above this invention is particularly efficacious for military aircraft powered by a twin spool, axial flow gas turbine engine either of the fan or straight jet variety. A typical installation where this invention would be applicable is for the F-100 family of engines manufactured by Pratt & Whitney Aircraft, a division of United Technologies Corporation, the assignee of this patent application, and reference should be made thereto for further details.

Figure 1:
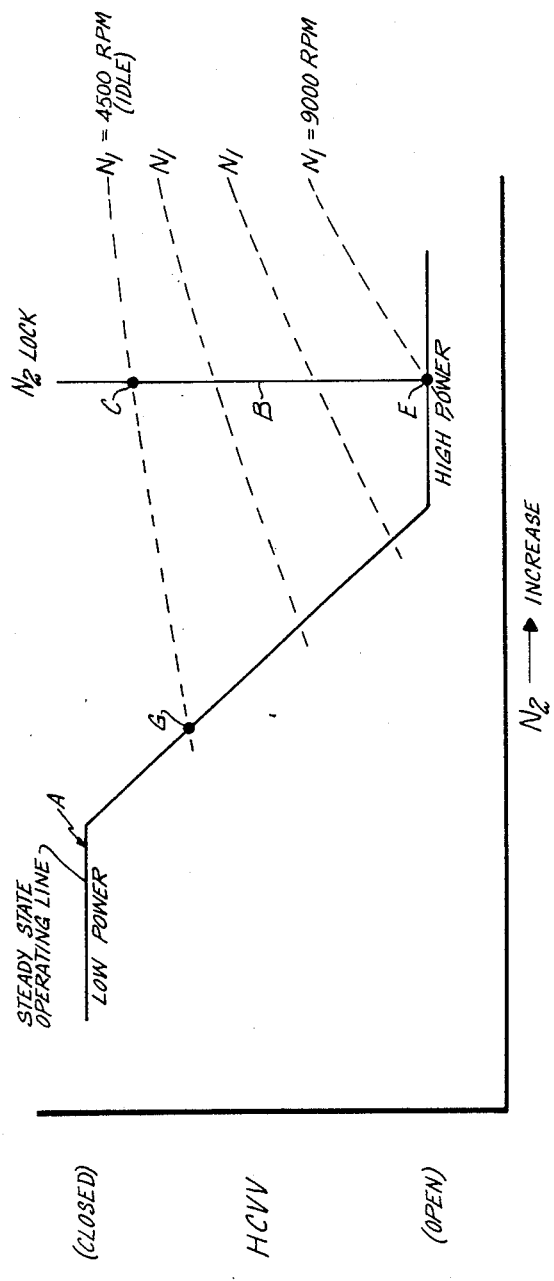
FIG. 1 is a graphical representation of the high spool operating line plotting the high compressor variable vane (HCVV) to the high pressure compressor speed ($N_2$) corrected for its inlet conditions illustrating the features of this invention.

To fully appreciate the objectives of this invention reference should be made to FIG. 1 which shows a typical operating line of the gas generator, i.e., HCVV plotted against $N_2$ (unless otherwise specified all speed parameters are intended to be their corrected value). Curve A illustrates the usual operating line of the gas generator and, as noted, power or $F_n$ increases as $N_2$ increases. In this particular plot showing the relationship of the HCVV, the vanes open at the high power conditions, close at low power condition and are modulated therebetween.

The operating line is manifested by the coordinated efforts of controlling fuel and the vanes which is typically controlled as a function of engine and aircraft operating variables. According to this invention rapid transients can be produced by controlling the HCVV such that high compressor airflow is modulated at constant or nearly constant $N_2$. Curve B is illustrative of a transient deceleration to a lower power thrust value identified as point C on curve B. As is apparent from the graph, the AHCC serves to hold $N_2$ constant (curve B) while modulating the HCVV until the engine attains the target (point C). If a bodie is exercised, the engine is accelerated back to the high power illustrated by point E by again merely adjusting HCVV and controlling along curve B.

If the bodie maneuver in the above example is not exercised, $N_2$ would remain fixed at point C. In accordance with this invention, after a given interim the AHCC trims the HCVV and fuel flow to return the setting to the operating line (curve A) to the steady state operating point illustrated by point G along the $N_1$ line, $N_1 = 4500$ RPM in this example. This is the condition of optimum engine performance from a TSFC and stability standpoint.

While the example above describes a transient excursion at a selected $N_2$ speed setting, these excursions will occur at any point along the operating line.

In its preferred embodiment the fuel control and AHCC are the electronic, digital type of controller and the fuel control may be, for example, the fuel control Model #EEC-106 manufactured by the Hamilton Standard division of United Technologies Corporation (incorporated herein by reference) or may be implemented by other mediums, such as, hydro-mechanical, electromechanical, and the like. As will be best understood by those skilled in the art, once the function's logic is understood, state-of-the-art technology can be implemented to execute this invention.

As is apparent from the foregoing, the control will operate to attain the gas generator ($N_2$) operating line by normal adjustment by the fuel control by the flow of fuel to the engine's combustor. Normal transients are likewise manifested in this manner. For rapid transient excursions, such as those contemplated when operating in the combat box, the control will automatically control the engine's acceleration and deceleration modes as a function of the primary control parameter $N_1$. $N_1$, therefore, is scheduled as a function of power lever angle $\alpha$ which automatically sets engine thrust by proper scheduling of total engine airflow and engine pressure ratio by virtue of adjusting the HCVV and fuel flow. Thus, in this instance, $N_1$ is utilized as the primary control parameter for scheduling both fuel flow and HCVV.

Figure 2:
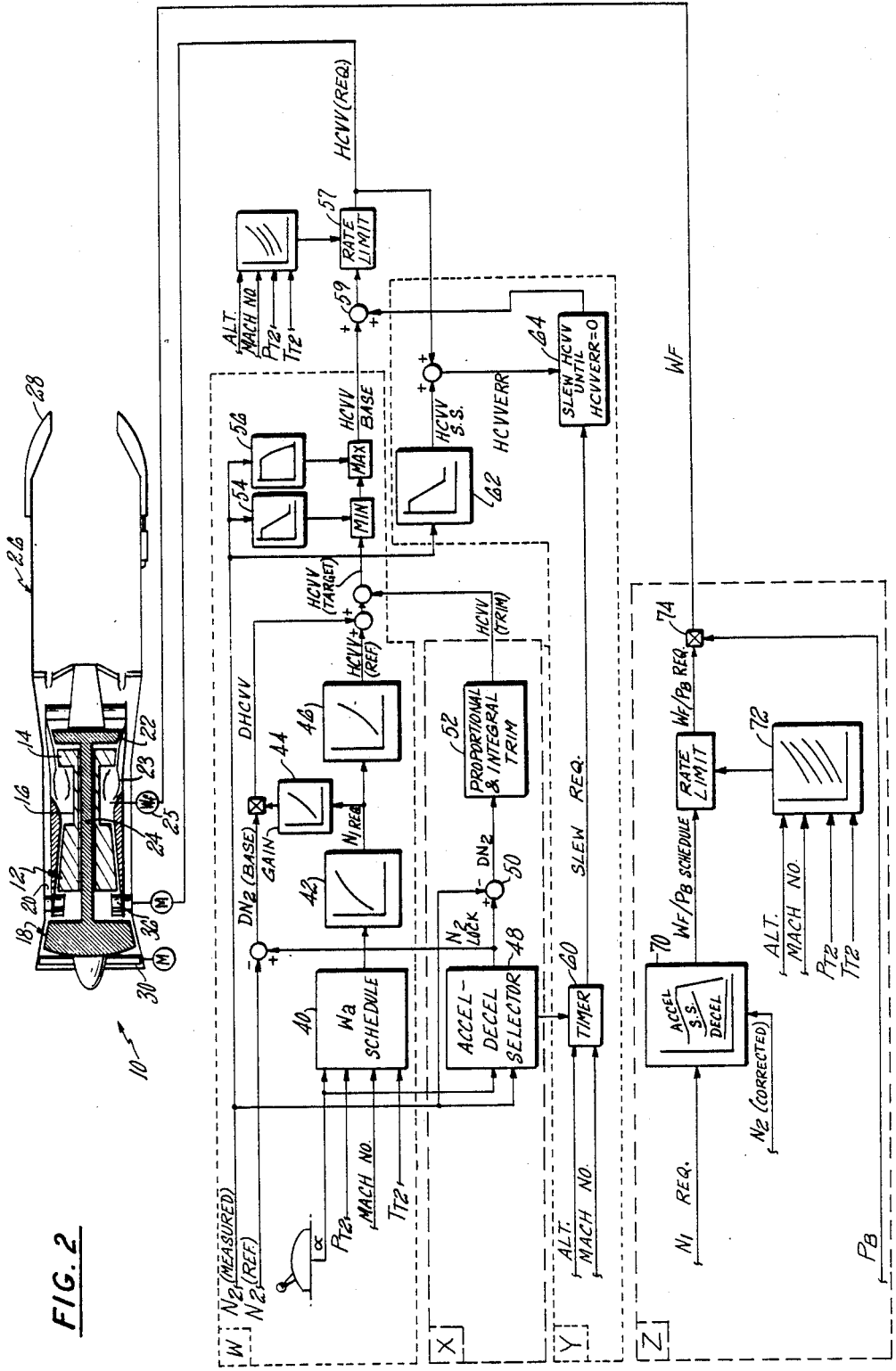
FIG. 2 is a schematic and block diagram illustrating the overall relationship of the control to the gas turbine engine and illustrating the control logic of this invention.

The type of engine for which this invention is particularly efficacious is schematically illustrated in FIG. 2 as being a fan jet engine generally illustrated by reference numeral 10 and comprised of an axial flow twin spool configuration. As schematically shown, the high pressure spool consists of a plurality of stages of compression generally illustrated by reference numeral 12 driven by the first stage turbine 14 and interconnected thereto by shaft 16.

The low pressure spool consists of the fan/low pressure compressor combination generally illustrated by reference numeral 18 where the fan portion discharges through the outer annular passageway 20 and the low pressure compressor discharges into the inlet of the high pressure compressor. Low pressure turbine stages 22 serve to power the fan/low pressure compressor 18 which is connected thereto by shaft 24. A suitable combustor 23 is interposed between the compressor section and turbine section where fuel is combusted to provide the working medium for powering the turbines and generating thrust. Fuel is fed to the combustor by throttle valve 25 as will be described hereinbelow.

The engine may utilize a suitable augmentor generally indicated by reference numeral 26 and a suitable variable jet nozzle 28. The engine may also be equipped with variable vanes 30 and 36 at inlets of the fan and the high pressure compressor respectively.

As an understanding of the details of the engine are not necessary for an understanding of this invention, for the sake of convenience and simplicity, they are omitted herefrom. It is, however, necessary to understand that the invention is solely applicable in a single or multiple twin spool engine that has variable vanes at the inlet and/or other stages of the high pressure compressor.

The electronic digital controller is comprised of four distinct circuits, W, X, Y and Z. While each of these circuits respond to a plurality of measured variables, these signals are interconnected to each of the circuits so that these signals are shared as needed.

In circuit W engine airflow is scheduled as a function of power lever position $\alpha$, fan inlet pressure and temperature and aircraft Mach No. The output of the function generator 40 becomes the input to function generator 42 for setting a $N_1$ request signal. This $N_1$ request signal becomes the control parameter for scheduling both a referenced HCVV position (HCVVREF) and a HCVV error signal (DHCVV). The DHCVV signal is derived by applying a gain (slope of the $N_1$ line of FIG. 1) via gain controller 44 and a $N_2$ speed error signal (DN2BASE) which is generated as an error signal between a referenced $N_2$ preselected value ($N_2$ Ref) and a locked $N_2$ value (curve B in the example of FIG. 1) set by the accel/decel selector 48 in circuit X of the AHCC. The $N_2$ lock assures that the power lever position will consistently attain a given thrust for each power lever angle and won't be adversely affected by power extraction or changes in the engine's performance due to wear and tear. As noted, the $N_2$ lock is a mixture of the power lever angle signal and actual $N_2$.

The targeted value, i.e., the desired thrust corresponding to the position of the power lever, is a sum of DHCVV, HCVVREF and HCVV trim. The HCVV trim signal is a speed error signal (DN2) from the summer 50 that adds the $N_2$ locked value and the actual $N_2$. The DN2 signal is fed to a proportional and integral controller 52 that trims the $N_2$ speed signal to assure it maintains a constant or substantially constant value when the engine decelerates to the targeted value (curve B of example in FIG. 1).

A maximum and minimum HCVV value set by function generators 54 and 56 limits the HCVV base signal as a function of measured $N_2$. The limits regulate the opening and closing of vanes of the HCVV to stay within prescribed boundaries of the $N_2$ compressor map. If necessary and to assure that the vanes do not open or close too quickly, a rate limiter 57 which may be adjusted as a function of any number of engine and/or aircraft operating parameters such as altitude, Mach No., $P_{T2}$ and $T_{T2}$ applied to the output of summer 59.

Circuit Y of the controller serves to return the engine to its operating line (curve A of FIG. 1) after a predetermined time after the target value has been reached. The time set in a timer 60 may be preselected as a function of altitude and/or aircraft Mach No. At the termination of the timer, the HCVV are slewed from their temporary positions to the steady state schedule (HCVVSS) which is established by the function generator 62 as a function of measured $N_2$. The controller 64 is a function of HCVVSS, a feedback signal of the position of HCVV and the slew request signal (the output of timer 60). As HCVV and Wf are trimmed, the $N_2$ value is returned to the steady state operating line (point G in the example shown in FIG. 1).

Fuel flow is regulated by circuit Z which schedules fuel flow by generating a $W_f/P_B$ signal as a function of the $N_1$ request signal generated by the function generator 42 in the W circuit (where $W_f$ is fuel flow in pounds per hour and $P_B$ is the high compressor discharge pressure or the pressure of the engine's combustor.

The function generator 70 serves to schedule the $W_f/P_B$ value as a function of measured $N_2$. The $W_f/P_B$ may be rate limited as shown by the function generator 72 as a function of any number of engine and/or aircraft operating variables, such as, Alt., Mach No., $P_{T2}$ and $T_{T2}$. The $W_f/P_B$ request value is then multiplied by a suitable multiplier 74 by the measured $P_B$ value to produce a fuel flow ($W_f$) signal for driving the throttle valve 25 and regulating fuel flow to the engine's combustor.

The synchronization of the fuel flow rate of change and the HCVV (req) rate of change provide unique control and adjustment capability of high compressor operating line, especially during engine thrust accels. If the engine has been previously at high power and a thrust re-accel performed before the decel timer permits scheduling of HCVVSS, extremely fast thrust accelerations are possible since power is not dependent on significant high rotor speed re-acceleration, if any.

Although this invention has been shown and described with respect to detailed embodiments thereof, it will be understood by those skilled in the art that various changes in form and detail thereof may be made without departing from the spirit and scope of the claimed invention.

We claim:

1. A control for controlling a gas turbine engine for powering aircraft during rapid accelerations and decelerations operating modes, said gas turbine engine having a first spool comprising a high pressure compressor and a first turbine driving said high pressure compressor and a second spool comprising a low pressure compressor and a second turbine driving said low pressure compressor and said first spool and said second spool being solely aerodynamically coupled, fuel metering means for regulating the flow of fuel to said engine, and variable vanes for said high pressure compressor for regulating the airflow thereto, means for controlling said engine to operate on a predetermined high pressure compressor steady state operating curve and having the speed of said first spool and said second spool being at a predetermined relationship, a power lever, said control including means responsive to the position of said power level for establishing a thrust value for adjusting said engine to accelerate and decelerate rapidly, said control having additional control means responsive to engine and aircraft operating variables for generating a first signal requesting a desired corrected low compressor speed ($N_1$), means responsive to said first signal and a preselected fixed corrected high pressure compressor speed ($N_2$) for generating a desired airflow from said variable vanes, means responsive too said power lever for selecting a constant $N_2$, means responsive to the difference of said selected constant $N_2$ and measured $N_2$ including a proportional and integral controller for adjusting said variable vanes to accelerate or decelerate said engine to said value established by said power lever, and means responsive to a timed signal to adjust said variable vanes as a function of said desired corrected low pressure speed operating in cooperation with said means for adjusting said fuel metering means to return said engine to operate on said high pressure compressor steady state operating curve.

2. A control as in claim 1 including means responsive to measured $N_2$ for establishing a maximum and minimum value of air flow flowing through said variable vanes by limiting the opened and closed position of said variable vanes.

3. A control as in claim 2 wherein said engine and aircraft operating variables for said additional control means includes aircraft Mach No. and total pressure at the inlet of said high pressure compressor.

4. A control as in claim 3 including the additional engine operating parameter of total temperature at the inlet of said high pressure compressor.

5. A control as in claim 4 including means responsive to aircraft altitude and Mach No. and total pressure and total temperature measured at the inlet of said high pressure compressor for limiting the rate of travel of said variable vanes.

6. A control as in claim 5 wherein said engine includes a burner and wherein said means responsive to said timed signal for adjusting fuel flow includes means responsive to a function of said requested $N_1$ and measured $N_2$ for producing a second signal ($W_f/P_B$) and means responsive to the multiplicand of $W_f/P_B$ and measured pressure of said burner for controlling said fuel metering means.

7. A control as in claim 2 wherein said time signal is modified as a function of aircraft altitude and Mach No.

* * * * *